R. DOUGLAS.
FURROW SLICING MACHINE.
APPLICATION FILED FEB. 7, 1912.

1,055,618.

Patented Mar. 11, 1913.

UNITED STATES PATENT OFFICE.

ROBERT DOUGLAS, OF LIPTON, SASKATCHEWAN, CANADA.

FURROW-SLICING MACHINE.

1,055,618.   Specification of Letters Patent.   Patented Mar. 11, 1913.

Application filed February 7, 1912. Serial No. 676,066.

*To all whom it may concern:*

Be it known that I, ROBERT DOUGLAS, of the village of Lipton, in the Province of Saskatchewan, Canada, have invented certain new and useful Improvements in Furrow-Slicing Machines, of which the following is the specification.

The invention relates to a machine for slicing or cutting up furrows turned by the usual plow on a field, the device being attached to the plow frame and located behind the moldboard, and the object of the invention is to supply an inexpensive, adjustable and durable device which can be readily connected preferably to the ordinary form of sulky plow and when attached and adjusted in proper position will cut or slice the furrow immediately it is turned by the mold board of the plow.

The invention consists essentially in a draft bar secured to the rear end of a plow frame and suitably braced, a pivoted more or less upright frame carried by the draft bar, a plurality of cutting blades pivotally secured to the frame, and means for adjusting and applying pressure on the outer ends of the blades, the parts being arranged and constructed as hereinafter more particularly described.

Figure 1:
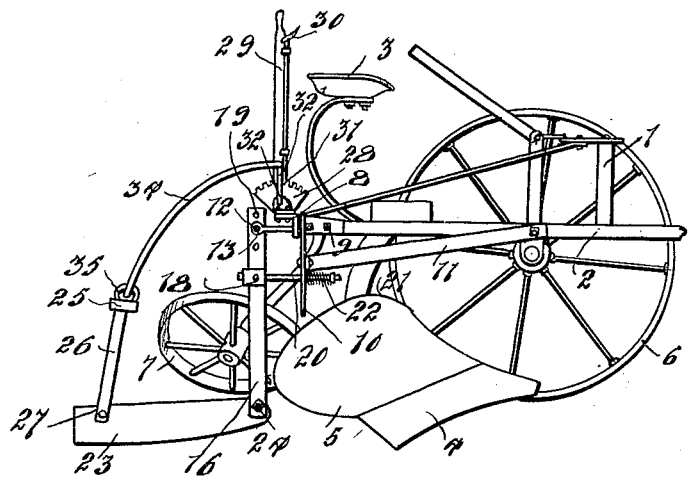
Figure 2:
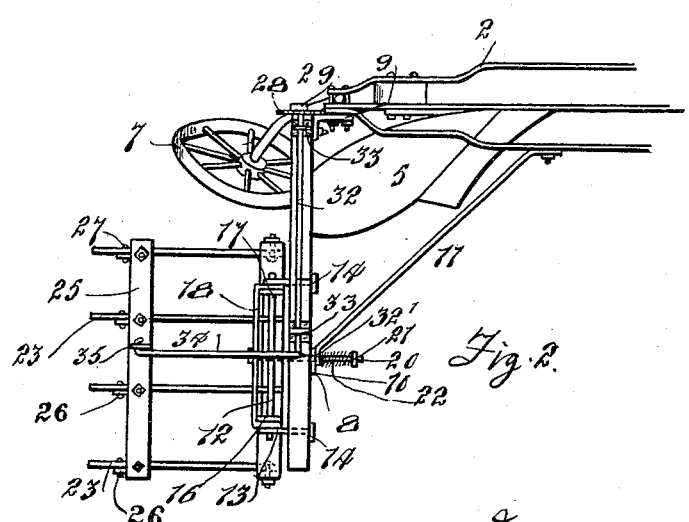

Figure 1 is a side view of the device applied on a sulky plow. Fig. 2 is a plan view of the same.

In the drawing like characters of reference indicate corresponding parts in each figure.

1 represents a sulky plow supplied with a frame 2, a seat 3 and a plow 4, of which 5 is the moldboard, the frame being mounted on the usual carriage wheel 6 and follower wheel 7.

8 is a draft bar of angle iron cross section secured rearwardly by a bracket 9 to the plow frame and extending more or less at right angles from the frame in the opposite direction to the landside.

10 is a flat bar secured to and extending downwardly from the bar 8 and connected to the forward portion of the frame by an angularly disposed brace 11.

12 is a rod having the ends thereof mounted in eyes 13 located at the rear ends of bolts 14 extending rearwardly from the draft bar.

15 is a vertically directed frame formed from two similar side pieces 16 and 17 connected by a cross piece 18. The frame is supplied at the top with adjusting openings 19 which receive the cross rod 12 which supports the frame.

20 is a bolt carried centrally by the cross piece 18 which bolt passes forwardly slidably through the bar 10 and has its forward end fitted with an adjustable nut 21. A spiral spring 22 is located on the bolt between the nut and the bar 10.

23 are similar blades pivotally secured forwardly to the lower end of the frame by a cross rod 24, it being noticed that the frame is located so that the blades appear immediately to the side and to the rear of the moldboard.

25 is a cross beam carrying independently downwardly directed bars 26 secured permanently at 27 to the rear ends of the respective blades.

A quadrant 28 is located on the plow frame, as is also a lever 29, the lever being supplied with the usual hand latch 30 and detent 31 which operates on the quadrant.

32 is a shaft secured to the lever and mounted in suitable bearings 33 located on the bar 8. One end of the shaft is formed into a crank 32′ which is connected by a suitable rod 34 to an eye 35 located centrally on the beam.

The construction just described allows the operator to adjust the position of the blades by swinging the lever forwardly or backwardly to raise or lower the blades. The spring 22 allows the upright frame with the blades to swing backwardly or give if an obstruction is met so that the parts are not broken.

What I claim as my invention is:—

1. The combination with a plow frame supplied with the usual plow, of a suitable reinforced draft bar secured to the rear end of the plow frame and extending to the side thereof, an upright frame pivotally supported from the draft bar, spring operated means normally holding the upright bar in a set position, a plurality of cutting blades pivotally secured to the lower end of the upright frame and means for adjusting the position of the rear ends of the cutting blades, said means being operated from the plow frame, as and for the purpose specified.

2. The combination with a plow frame supplied with the usual plow, of a suitable reinforced draft bar secured to the rear end of the plow frame and extending to the side thereof, an upright frame pivotally supported from the draft bar, a bar secured to and extending downwardly from the draft bar, a bolt passing forwardly from the upright frame into and through the downwardly directed bar, an adjustable nut on the forward end of the bolt, a spring located on the bolt between the nut and the bar, a plurality of cutting blades pivotally secured to the lower end of the upright frame, a cross beam located above the rear ends of the blades and connected to the same permanently by upright bars, a lever located on the plow frame, a shaft controlled by the lever and having a cranked end, and a rod connecting the cranked end of the shaft with the cross beam, as and for the purpose specified.

3. The combination with a plow frame supplied with the usual plow, of a suitable reinforced draft bar secured to the rear end of the plow frame and extending to the side thereof, an upright frame pivotally supported from the draft bar, a bar secured to and extending downwardly from the draft bar, an adjustable means connecting the upright frame and the downwardly directed bar for normally holding the upright frame in set position, a plurality of cutting blades secured to the upright frame, and means for adjusting the position of the rear ends of the cutting blades.

4. The combination with a plow frame supplied with the usual plow, of a draft bar secured to the rear end of the plow frame, and extending to the side thereof, a vertically adjustable upright frame supported from the draft bar, a depending bar secured to the draft bar, means connecting the upright frame and depending bar for holding the upright frame in set position, cutting blades secured to the upright frame, and means for adjusting the rear ends of said cutting blades.

Signed at Stratford in the Province of Ontario this 20th day of January 1912.

ROBERT DOUGLAS.

In the presence of—
JANE NUGAN,
E. S. WHITE.

---

Copies of this patent may be obtained for five cents each, by addressing the "Commissioner of Patents, Washington, D. C."